United States Patent [19]
Broussard et al.

[11] Patent Number: 6,144,618
[45] Date of Patent: Nov. 7, 2000

[54] SEISMIC CABLE BOOT AND HYDROPHONE RETAINER

[75] Inventors: Blaine L. Broussard, P.O. Box 401, Loreauville, La. 70552; Toby G. Dugas, Loreauville, La.

[73] Assignee: Blaine L. Broussard, Loreauville, La.

[21] Appl. No.: 09/160,473

[22] Filed: Sep. 24, 1998

[51] Int. Cl.[7] ........................................... G01V 1/04
[52] U.S. Cl. ..................... 367/178; 367/188; 181/120; 181/118
[58] Field of Search ................... 367/178, 188; 181/120, 118

[56] References Cited

U.S. PATENT DOCUMENTS

| | | | |
|---|---|---|---|
| 4,131,178 | 12/1978 | Bouyoucos | 181/120 |
| 4,811,311 | 3/1989 | Woodall, Jr. et al. | 367/178 |

*Primary Examiner*—Christine Koda
*Assistant Examiner*—Anthony Jolly
*Attorney, Agent, or Firm*—Robert N. Montgomery

[57] ABSTRACT

A molded protective body member for seismic cable hydrophone and geophone sensors and their cable splice connections from underwater obstructions and pay-out and retrieval apparatus. The body member is a one piece polymeric member having interior cavities, risers and apertures. When in use, the body member is folded longitudinally in half around the seismic cable at a hydrophone or geophone splice joint and secured in place with recessable molded straps having threaded fasteners passing through each of the body halves thus clamping the body to the cable. At least one interior diametrical cavity is provided consistent with the type seismic cable sensor used. With the sensor and its associated cable and connector positioned within the protective body member, tie wraps are threaded through apertures along and adjacent the longitudinal edges of each half thus closing the interior of the body member. Cavities are also provided internally for placing lead weights. Lead weights may also be attached directly to the seismic cable within apertures provided within a portion of the body member.

18 Claims, 7 Drawing Sheets

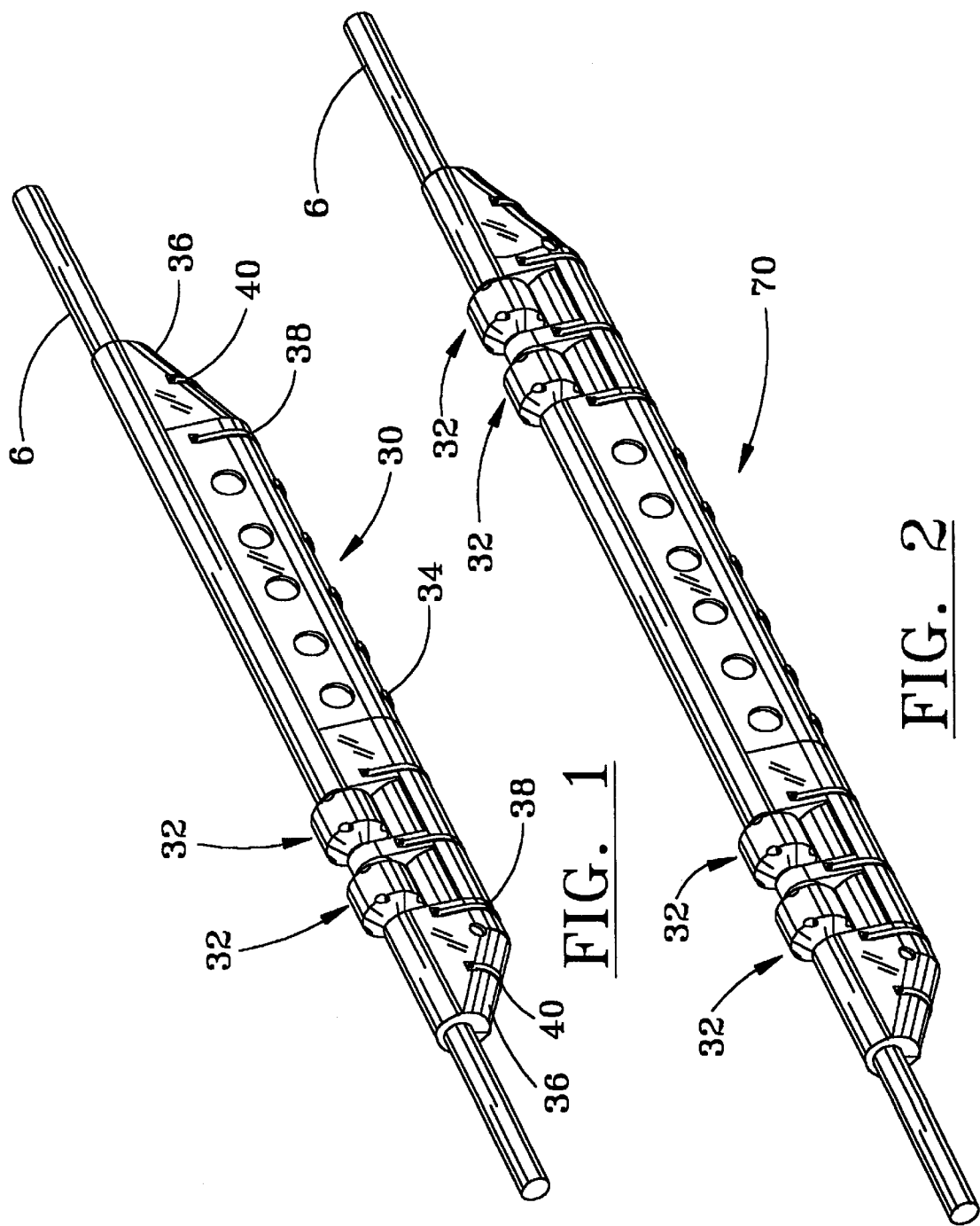

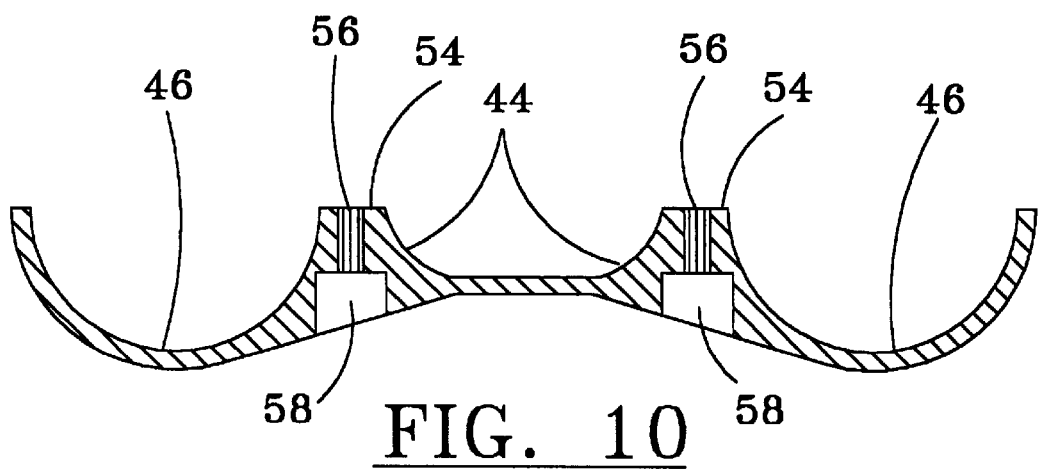
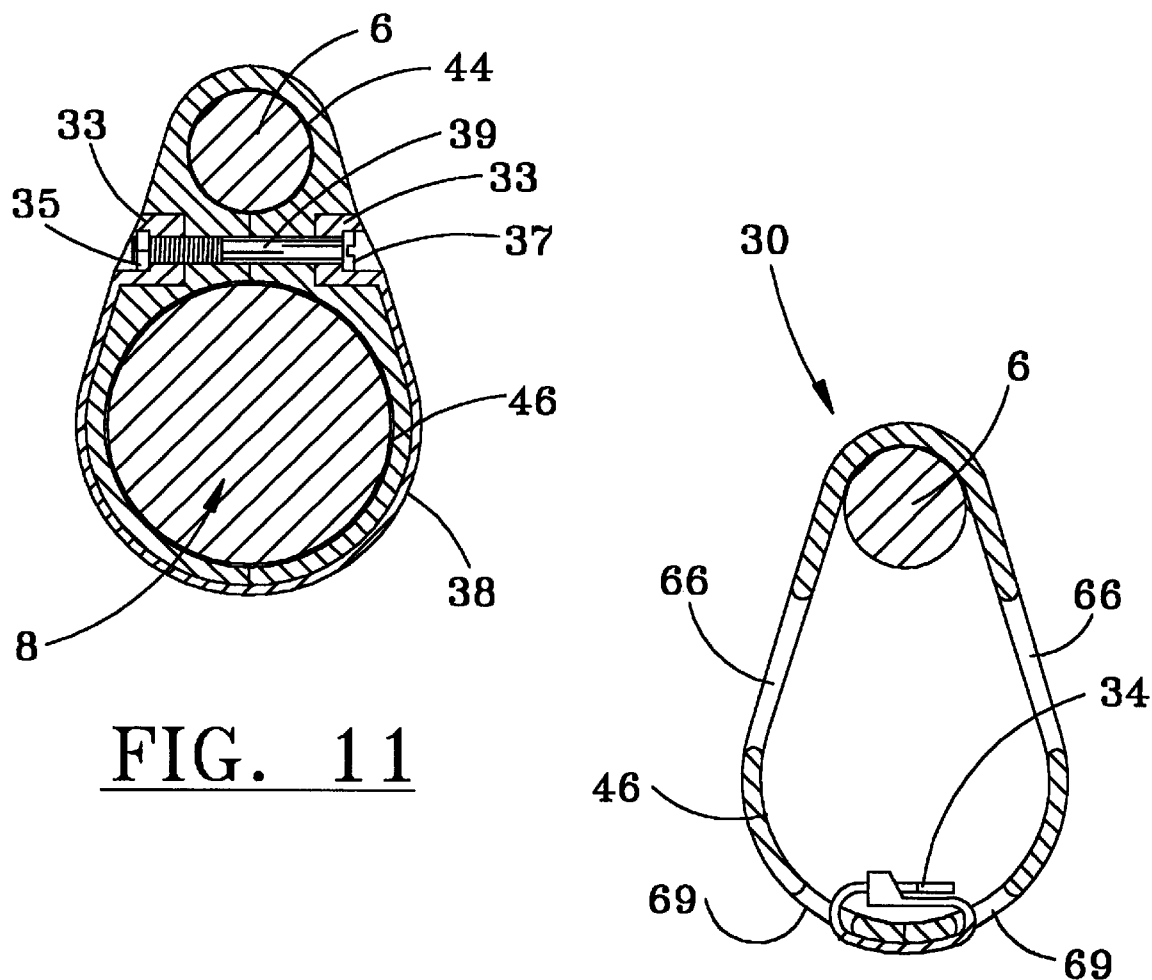

6,144,618

SEISMIC CABLE BOOT AND HYDROPHONE RETAINER

BACKGROUND OF THE INVENTION

1. Field of the Invention

This invention relates generally to seismic cable apparatus and more particularly to the adaptation of a protective covering and flow through holder for dual sensor hydrophones splicing spaced along such seismic cables.

2. General Background

Underwater seismic cables with geophone/hydrophones attached thereto are deposited along the sea bed and bottoms of relatively shallow lakes and streams and connected to instrumentation for obtaining seismic data transmitted through the earth's strata in the exploration process for oil and gas. The geophone/hydrophone sensors attached at intervals along the cable serve as listening apparatus for signals being transmitted through the earth. The splice connection for each geophone or hydrophone is often hand made and covered by water proof tape. Each splice leads to a watertight coupling connector extending from a hydrophone or geophone sensor. Rather than allow the geophone or hydrophone sensor to swing free and perhaps become entangled or other wise damaged, various types of flexible holders have been developed and utilized which provide secure attachment of the sensor to the cable adjacent the cable splice point. Such holders either capture the sensor or allow the sensor to be removably inserted without removing the holder from its attachment with the cable. In most cases the holders are molded pliable polymeric units with flow through capability configured in one or more pieces having a slit portion for encompassing the seismic cable and held in place on the cable with plastic tie wraps. These holders fail to provide any protection for the splice joint or the hydrophone or geophone connector and its cable loop becoming entangled, under water or damaged as a result of passing through the cable pay-out and retrieval apparatus. Such holders are limited to only one particular size and type of hydrophone or geophone. The holders previously utilized make no provision for the addition of weights which insure that the hydrophone or geophones remain in near proximity with the earth.

SUMMARY OF THE INVENTION

The seismic cable boot disclosed herein is an improved modular polymeric body for encompassing a seismic cable at hydrophone/geophone junctures. The boot further provides protection for the cable juncture and contains one or two hydrophone/geophone sensors in proper orientation with full fluid flow through capability. The boot is further configured to accommodate internal and external cable weights. The boot is also configured to reduce external protrusions which cause entanglements with underwater obstacles and reduce hang-up when passing through the cable pay-out and retrieval apparatus. The boot is comprised of a one piece molded polymeric body which is symmetrical about a central diametrical axis consistent with the diameter of the seismic cable to be used. The boot is therefore folded around the cable and stitched at regular intervals along the open side opposite the cable with molded tie straps fitted into pockets and secured with fasteners passing through the straps and the boot body. Additionally, tie wraps are provided threaded through eyelets along the central portion of the boot's open side for final closing of the gusset. These tie wraps allow the boot to be partially opened to allow access to the juncture in order to make-up and/or remove individual sensors. Pockets are provided above each hydrophone/geophone sensor for placement of contoured lead weights which help insure that the boot and its sensors are not buoyant and remain in contact with the earth.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 1 is an isometric view of the preferred embodiment for use as single sensor containment;

FIG. 2 is an isometric view of a second embodiment as extended to accept two sensors;

FIG. 10 is a cross section view of the embodiment illustrated in FIG. 8 taken along sight lines 10—10; and FIG. 11 is a cross section view of the embodiment illustrated in FIG. 9 taken along sight lines 11—11.

FIG. 12 is a cross section view of the embodiment illustrated in FIG. 9 taken along sight lines 12—12.

DETAILED DESCRIPTION OF THE PREFERRED EMBODIMENT

Figures 3, 4:
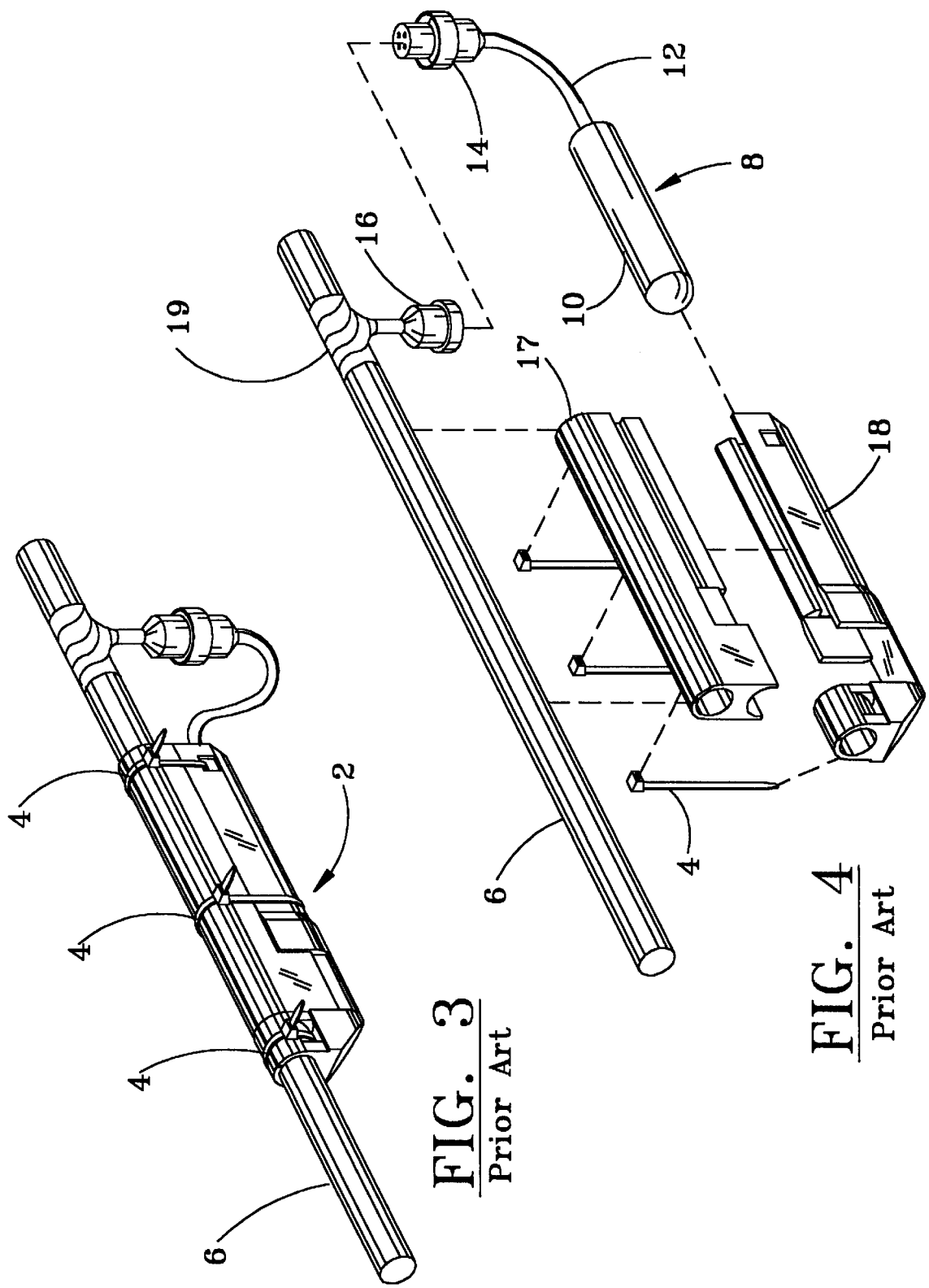
FIG. 3 is an isometric view illustrating a first embodiment of a prior art sensor holder.
FIG. 4 is an exploded view of the first embodiment of a prior art sensor holder illustrated in FIG. 3.

Turning first to FIG. 3 we see one embodiment of one type of geophone/hydrophone holder 2 strapped with tie wraps 4 to a seismic cable 6. A hydrophone assembly, which includes a sensor 10, an electrical cable loop and a watertight coupling connector portion best seen in FIG. 4, is fully captured in the holder assembly 2 which is molded in one upper 17 and one lower piece 18 which snap together around the phone sensor 10. The upper piece 16 is slid along its entire length for flexible attaching to the cable 6. The entire assembly, including the sensor assembly 8, is secured to the cable with tie wraps 4. The sensor assembly's connector portion 14 is then secured to the mating connector portion which is spliced into the cable and generally tape sealed 19.

Figures 5, 6:
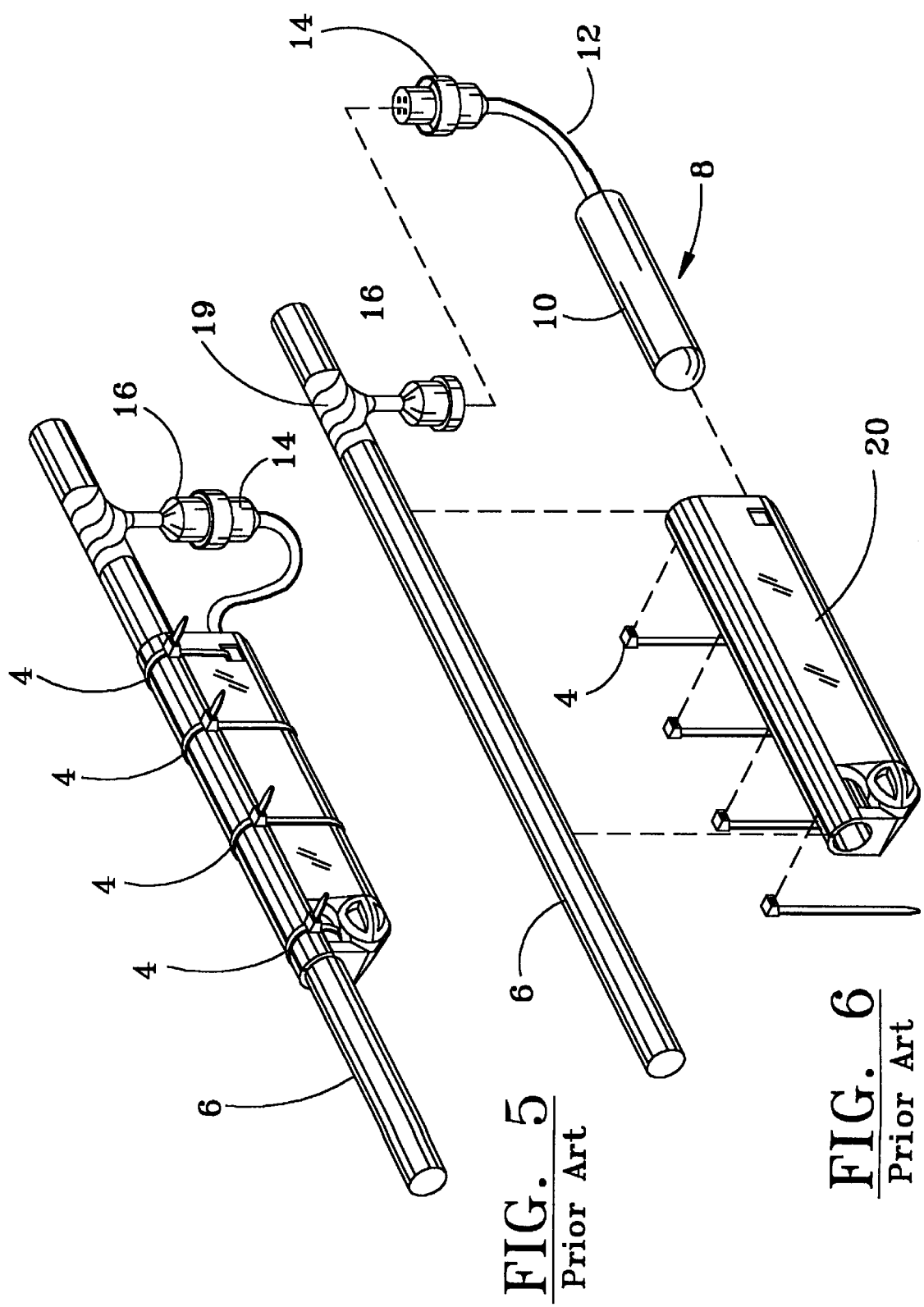
FIG. 5 is an isometric view illustrating a second embodiment of a prior art sensor holder.
FIG. 6 is an exploded view of the second embodiment of a prior art sensor holder illustrated in FIG. 5.

The prior art embodiment illustrated in FIG. 5 and 6 is utilized in a similar manner with the exception that the holder 20 is made in one piece and the sensor is not captured but is simply frictionally engaged within the holder 20.

Figure 7:
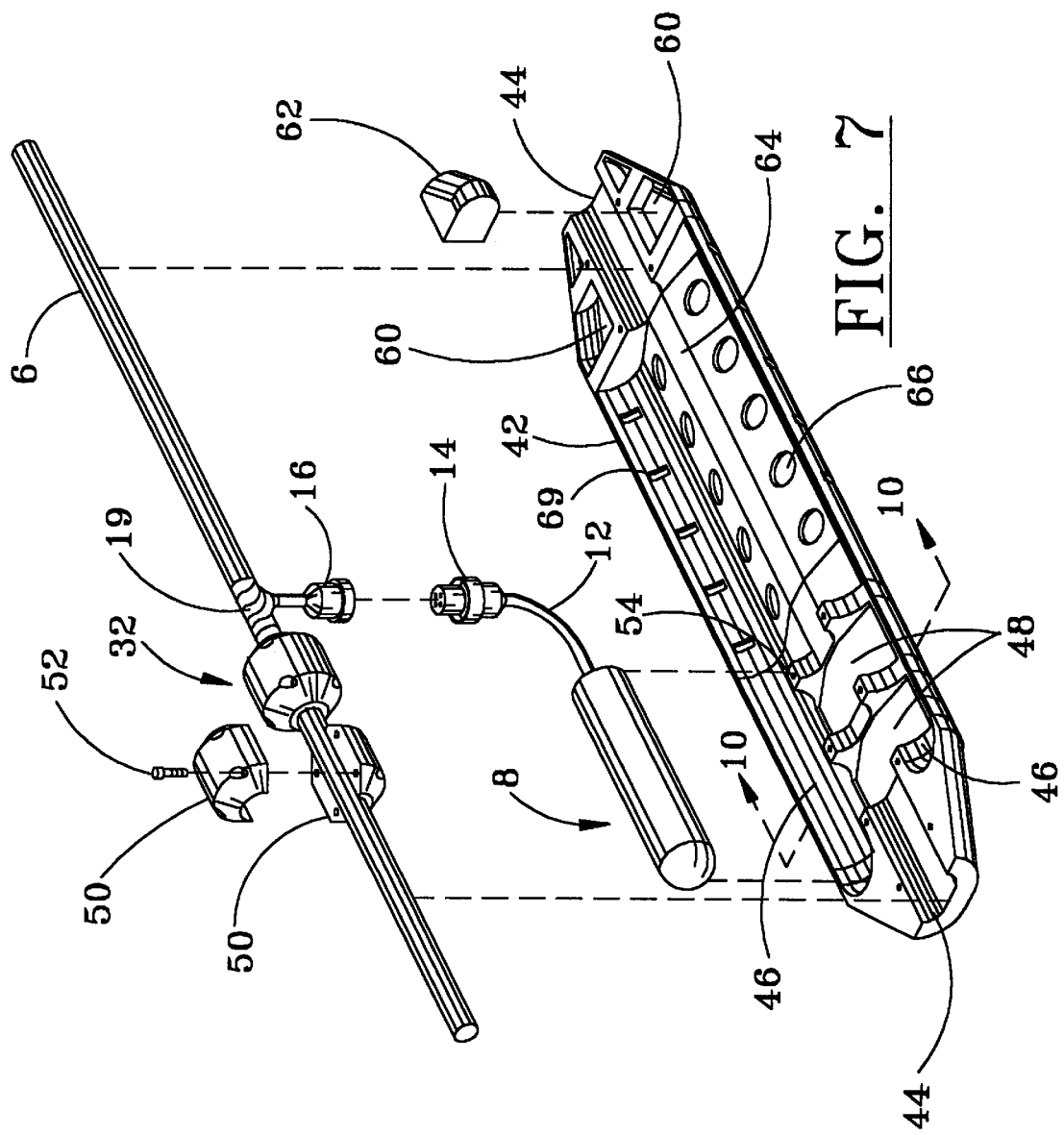
FIG. 7 is an exploded isometric view of the preferred embodiment illustrated in FIG. 1.

Returning now to FIG. 1, we see the first preferred embodiment 30 assembled as it appears attached to a seismic cable 6. Please note the lack of a slit along the length of the holder, no exposed connectors 14, 16, sensor cable loop 12 or tape spice 18 seen in FIG. 3 and the addition of weights 32, the non-projection of the tie wraps 34 and the symmetry of the sloped ends 36 associated with the preferred embodiments illustrated in FIGS. 1 and 2. Special straps 38, 40 provide both closure and clamping force for the boot/holder around the cable 6. As seen in FIG. 7 the boot/holder body 42 for a sensor 8 is a one piece, molded, polymeric member having a central diametrical axis about which the body 42 is folded, thereby forming an annulus 44 at each end passing therethrough for receiving a seismic cable and a parallel, elongated, diametrical, elongated pocket 46 at one end, as seen in cross section in FIG. 11, for receiving a hydrophone/geophone sensor 8. The pocket 46, best seen in FIG. 10, orientates the sensor 8 towards one end and is configured to accept several types of hydrophone/geophone sensors and hold them securely. The body 42 of the boot/holder 30 includes apertures which allow for the adaptation of a pair of lead weights 32 to the seismic cable 6. These weights are divided into two half sections 50 and secured together around the cable 6 with screws 52. The weights are also contoured with beveled ends and fastener recesses to help prevent hang-ups with pay-out and retrieval equipment. The body 42 maintains proper clearance and insures a snug fit for the seismic cable 6, and the sensors 8 as a result of internal standoffs 54, best seen in FIG. 10. These stand-offs have through holes 56 and square counter sinks 58 for receiving straps 38 seen in cross section in FIG. 11. The straps 38 are sized to fit the body when fully folded and have square blocks 33 at each end which are also recessed to accept a nut 35 on one end and the head 37 of a threaded fastener 39 at the other end as seen in FIG. 11. A pocket 60 is provided at the end opposite the diametrical pocket 46 for containing a molded lead weight 62. The space between the pockets 46 and 60 known as the gusset area 64 is perforated with several strategically placed apertures 66 which allows, for the free flow of water around sensitive areas of the hydrophone and through the boot 30, thus washing out any mud and sand which may have been collected by the boot while under water. A series of rectangular apertures 69 are provided for receiving plastic wraps 34 as a means for stitching the gusset 64 closed after insertion of the sensor 8 and its connector 14,16 and the internal weight 62. The tie wraps 34 are installed as seen in FIG. 12 whereby the tie is made up externally and then rotated internally to insure a relatively smooth outer configuration.

Figure 8:
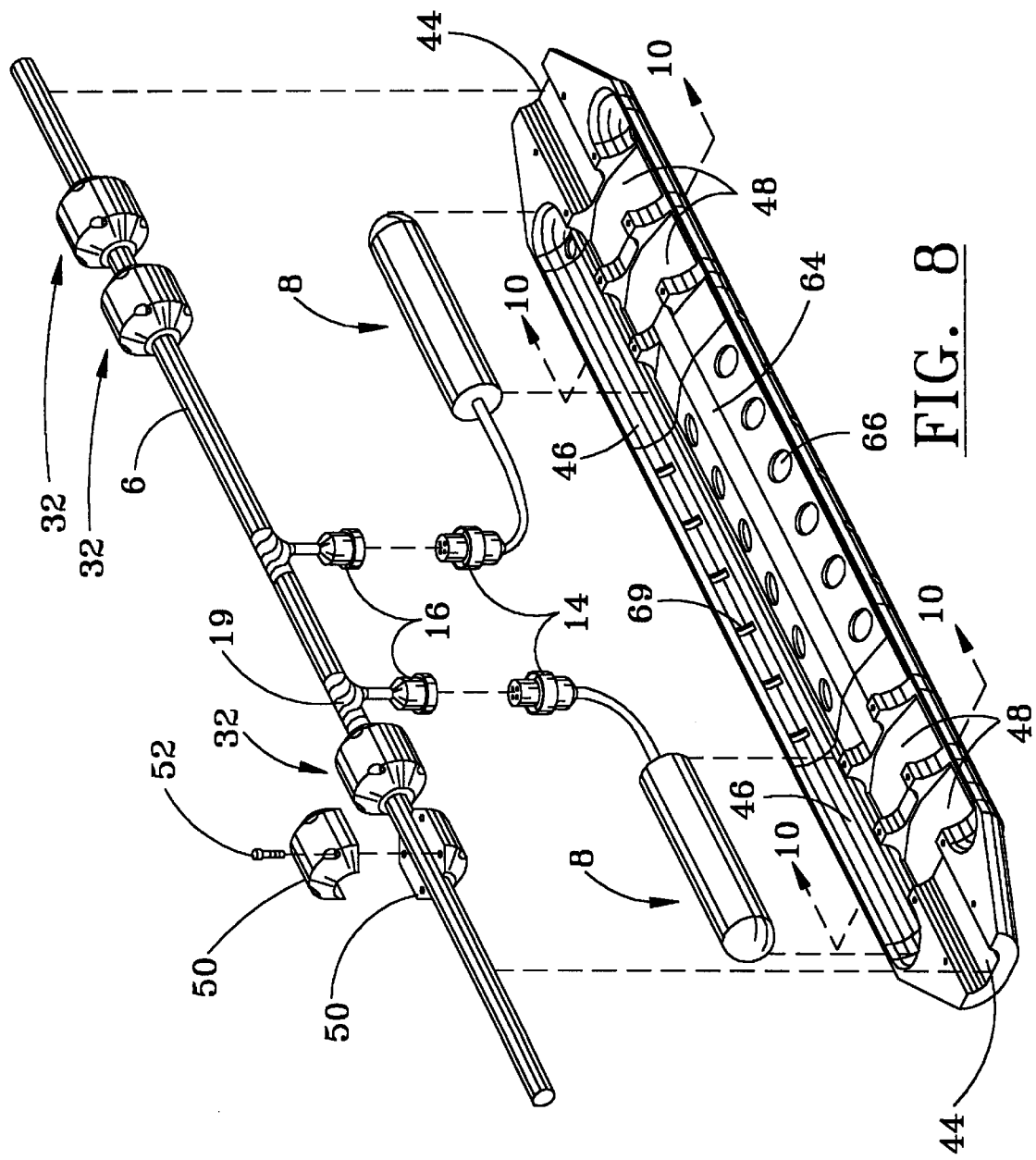
FIG. 8 is an exploded isometric view of the preferred embodiment illustrated in FIG. 2.
Figure 9:
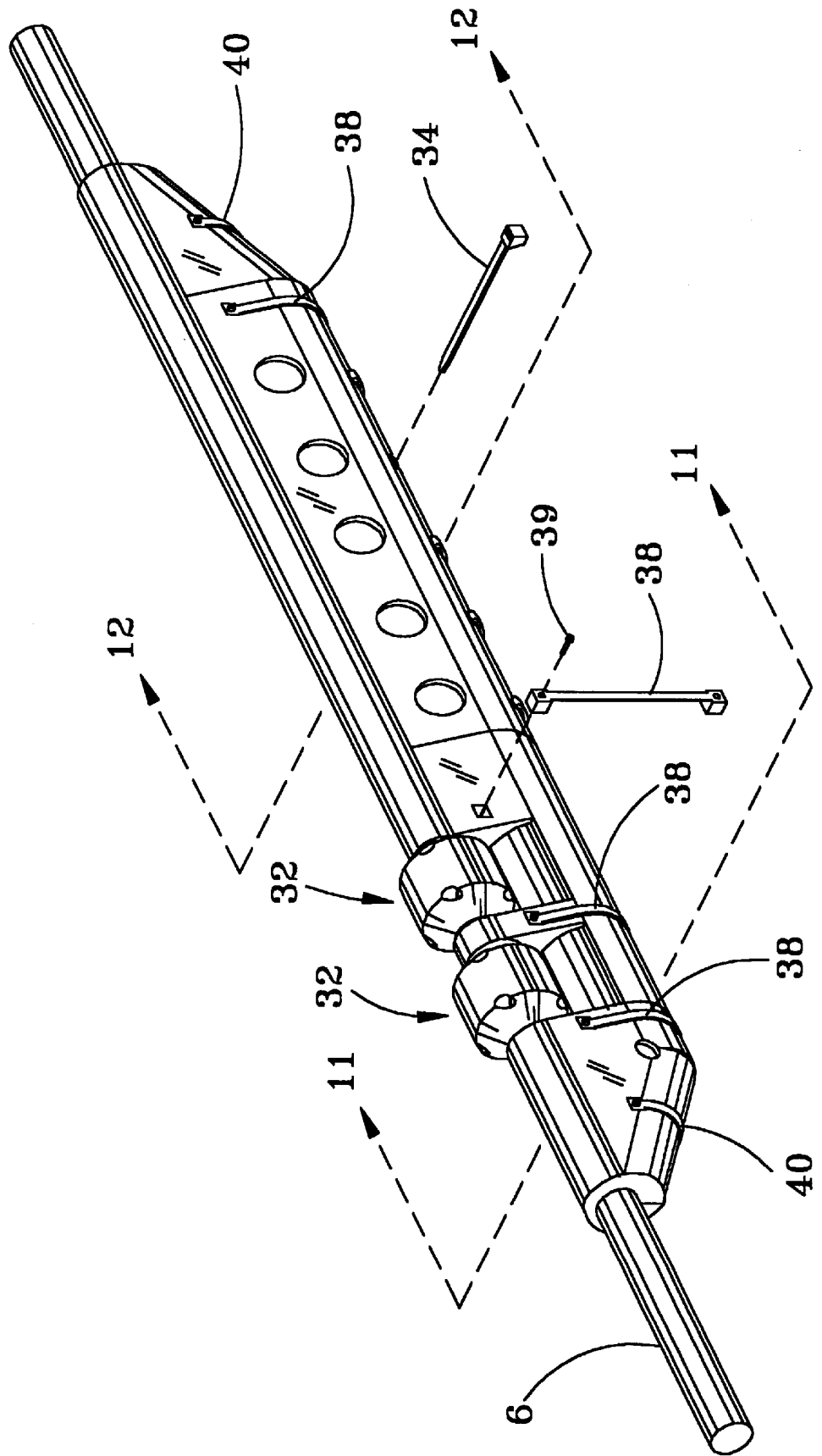
FIG. 9 is an partial exploded view of the embodiment illustrated in FIG. 1.

The second embodiment 70 as seen in FIG. 2 is essentially the same as that of the first embodiment 30 with he exception that this boot houses two hydrophone/geophone sensors 8 and their connectors 14,16 and makes provision for adapting external lead weights at each end, as seen in FIG. 8. Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A cable boot for housing a marine, seismic hydrophone and splice connection in subsea cables comprising an elongated, polymeric member molded in one planar piece having an interior and exterior side, said interior side having a central longitudinal channel said member, when folded along said longitudinal channel forming a diametrical annulus extending the longitudinal length of said member, each opposing portion of said folded member having a plurality of opposing matching cavities, risers, and a plurality of transverse apertures.

2. The seismic cable boot and sensor holder according to claim 1 wherein said exterior side comprises recessed pockets and transverse apertures located at each said riser location and adjacent each end.

3. The seismic cable boot and sensor holder according to claim 1 wherein said member is beveled at each end.

4. The seismic cable boot and sensor holder according to claim 2 wherein said member further comprises a plurality of molded straps comprising a block portion at each end, said block portion having apertures therethrough.

5. The seismic cable boot and sensor holder according to claim 4 wherein said member further comprises threaded fasteners passing through said strap blocks, said ends and said risers when said member is folded longitudinally and said block portions are inserted in said recessed pockets.

6. The seismic cable boot and sensor holder according to claim 1 wherein at least a portion of said interior side defines at least one diametrical cavity located parallel to said diametrical annulus consistent with that of said marine hydrophone when said member is folded longitudinally.

7. The seismic cable boot and sensor holder according to claim 1 wherein said member further comprises a plurality of polymeric tie straps threaded through at least some of said apertures when said member is folded.

8. The seismic cable boot and sensor holder according to claim 1 wherein said cable boot further comprises aperture means for attaching a plurality of lead weights to a seismic cable.

9. The seismic cable boot and sensor holder according to claim 8 wherein said lead weights comprise a cylindrical body having tapered ends, the body divided into two opposing identical portions having a through annulus, the two opposing portion secured together with fasteners.

10. A protective jacket and housing for underwater seismic cables comprising an elongated polymeric planar body member having a plurality of transverse apertures and tapered corners at each end, said body member when folded in half in a longitudinally folded configuration defines an interior portion having an annulus extending longitudinally therethrough for enclosing around a seismic cable, said interior having molded opposing diametrical cavities, at least one of which being consistent with a seismic hydrophone used with subsea seismic cables, said body member being held in said folded configuration with a plurality of polymeric tie straps having molded blocks at each end, cooperative with recessed external pockets in said body member and retained therein with threaded fasteners and a plurality of tie wraps threaded through apertures provided adjacent longitudinal edges of said body to insure interior cavity closure.

11. The protective jacket and housing for underwater seismic cables according to claim 10 further comprising at least one interior cavity for housing a lead weight.

12. The protective jacket and housing for underwater seismic cables according to claim 10 wherein at least one said interior cavity is consistent with the configuration of a geophone sensor.

13. The protective jacket and housing for underwater seismic cables according to claim 10 wherein said apertures are strategically located to insure water circulation through said body member and around sensitive areas of said hydrohpone.

14. The protective jacket and housing for underwater seismic cables according to claim 10 wherein a at least two of said apertures provide access for attaching lead weights directly to said seismic cable.

15. The protective jacket and housing for underwater seismic cables according to claim 10 wherein said fasteners are threaded bolts and nuts passing through said blocks and both halves of said body member.

16. A method of protecting and housing underwater seismic cable sensors and their cable connectors and splice cable leads from underwater obstruction and pay-out and retrieval apparatus comprising the steps of:
 a) providing an elongated polymeric body member having interior cavities, spacer risers, apertures and tapered corners;
 b) folding said body member longitudinally in half around a seismic cable at a spliced hydrophone connection;
 c) securing at least a portion of each said half, one to the other, with molded straps having blocks at each end recessed externally into each said half and passing a fastener through said blocks and each said half of said body member;
 d) inserting at least one hydrophone and its cable connector and associated cable inside and interior cavity; and
 e. closing a remaining portion of said body member with tie wraps threaded through apertures adjacent the longitudinal edges of each half.

17. The method of protecting and housing underwater seismic cable sensors and their cable connectors and splice cable leads from underwater obstruction and pay-out and retrieval apparatus, according to claim 16, further comprising the step of inserting a lead weight inside said interior cavity prior to closing said remaining portion of said body member.

18. The method of protecting and housing underwater seismic cable sensors and their cable connectors and splice cable leads from underwater obstruction and pay-out and retrieval apparatus, according to claim 16, further comprising the step of installing lead weights directly to said seismic cable exposed within apertures provided within said body member.

* * * * *